(12) United States Patent
Stedam

(10) Patent No.: US 7,231,930 B1
(45) Date of Patent: Jun. 19, 2007

(54) VALVE ASSEMBLY CLEANING DEVICE

(76) Inventor: Mack L. Stedam, 965 Highway 227 North, Sanders, KY (US) 41083

( * ) Notice: Subject to any disclaimer, the term of this patent is extended or adjusted under 35 U.S.C. 154(b) by 523 days.

(21) Appl. No.: 10/378,256

(22) Filed: Mar. 4, 2003

(51) Int. Cl.
*B08B 7/04* (2006.01)
*B08B 3/00* (2006.01)
*B08B 9/00* (2006.01)
*F02B 3/06* (2006.01)
*F02B 43/00* (2006.01)
*F02M 21/02* (2006.01)

(52) U.S. Cl. .............................. 134/169 A; 134/169 C; 134/18; 134/34; 123/27 GE; 123/525; 123/527

(58) Field of Classification Search ............ 134/166 R, 134/168 C, 167 C, 169 R, 169 A, 171, 172, 134/175, 176, 177, 178, 179, 186, 190, 191, 134/166 C, 22.1, 22.11, 22.12, 169 C, 34, 134/18
See application file for complete search history.

(56) References Cited

U.S. PATENT DOCUMENTS

| | | | |
|---|---|---|---|
| 4,499,267 A | 2/1985 | Scifoni | |
| 4,774,909 A | 10/1988 | Dolderer | |
| 5,055,210 A | 10/1991 | Miller | |
| 5,257,604 A * | 11/1993 | Vataru et al. | ........... 123/198 A |
| 5,271,361 A | 12/1993 | Flynn | |
| 5,287,834 A | 2/1994 | Flynn | |
| D348,507 S | 7/1994 | Ponka | |
| 5,724,948 A | 3/1998 | King et al. | |
| 5,879,466 A * | 3/1999 | Creger et al. | .................. 134/18 |
| 6,820,627 B1 * | 11/2004 | Cordova | ..................... 134/110 |

\* cited by examiner

*Primary Examiner*—Michael Barr
*Assistant Examiner*—Rita R. Patel

(57) ABSTRACT

A valve assembly cleaning device includes a conduit fluidly couples the liquid propane regulator and valve assembly to a propane tank. The cleaning system includes a first tube selectively coupled to the conduit such that the first tube is in fluid connection with the conduit and propane may flow from the propane tank to the assembly flows through the first tube. A container has a valve cleaning fluid therein. The container is in fluid communication with the first tube. Cleaning fluid may enter the conduit such that the valve assembly is cleaned by the cleaning fluid.

15 Claims, 1 Drawing Sheet

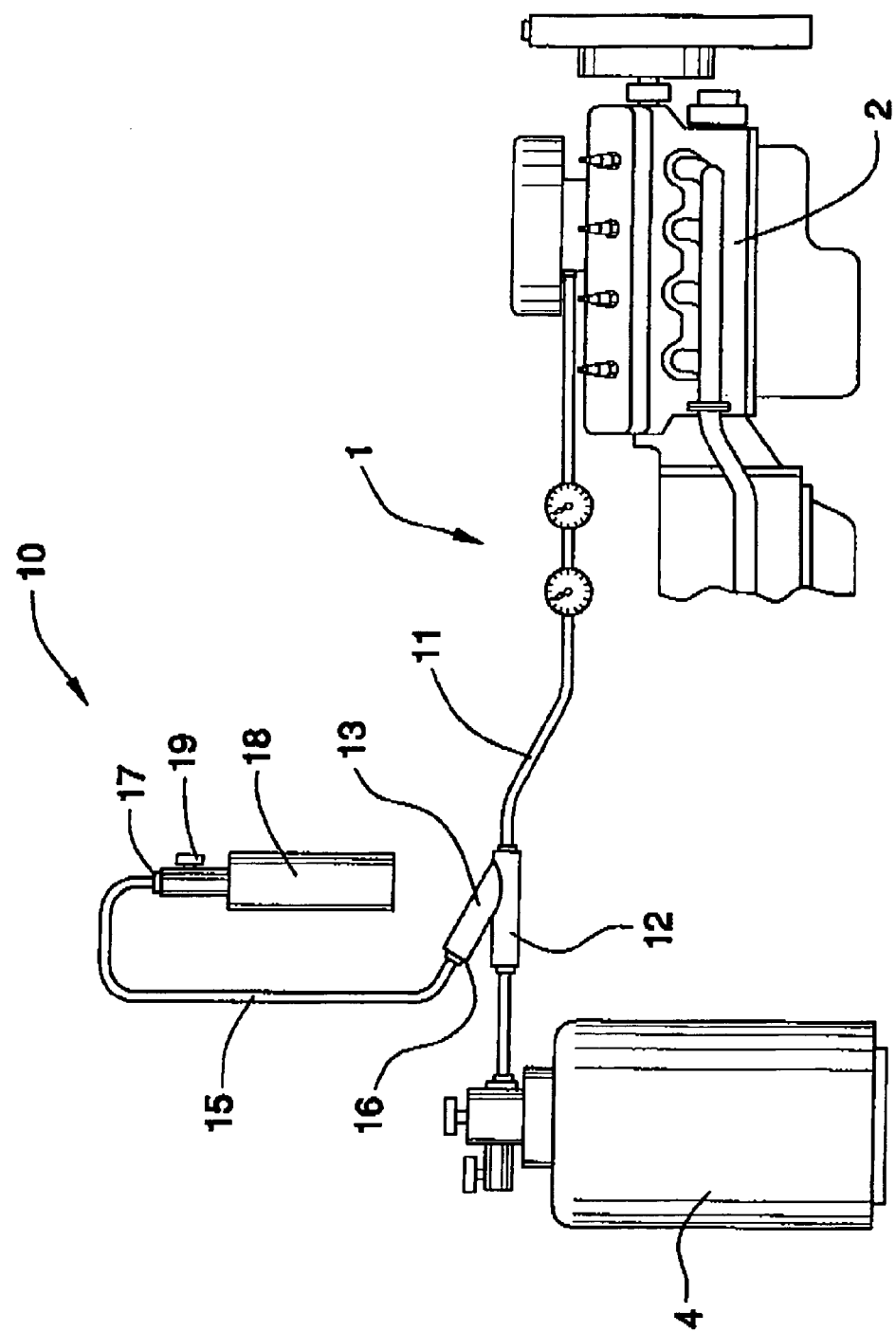

VALVE ASSEMBLY CLEANING DEVICE

BACKGROUND OF THE INVENTION

1. Field of the Invention

The present invention relates to engine cleaning systems and more particularly pertains to a new engine cleaning systems for effectively cleaning the needles, seats, and other internal components found in regulators for liquid propane engines.

2. Description of the Prior Art

The use of engine cleaning systems is known in the prior art. U.S. Pat. No. 5,271,361 describes an engine conditioning apparatus and method for cleaning carbon deposits and related residue and contaminants from fuel ports and internal surfaces of an internal combustion engine fuel system. Another type of engine cleaning system is U.S. Pat. No. 5,287,834 describes a method and apparatus for removing internal deposits and contaminants from fuel injected and carbureted internal combustion engines. U.S. Pat. No. 5,055,210 describes a cleaning and lubricating composition for mechanical seals prolonging their life.

While these devices fulfill their respective, particular objectives and requirements, the need remains for a system that includes enables a user to quickly and inexpensively clean the inner components of a liquid propane regulator and lock-off valve assembly.

SUMMARY OF THE INVENTION

An object of the present invention is to provide a new valve assembly cleaning device which cleans the inner components of a liquid propane regulator and lock-off valve assembly. The valve assembly is typically positioned between a propane burning engine and a propane tank. Generally, liquid propane from the propane tank becomes a gas as it travels through the valve assembly. As this happens, a chemical reaction takes place which deposits propylene on inner components of the valve assembly. As the propylene builds on the components, flow of the propane to the engine is restricted. When the flow is restricted to such a degree that it affects the operation of the engine, the valve assembly is replaced at substantial cost. It has been found that conventional carburetor cleaning fluid may be drawn through the valve assembly without harming the engine. The cleaning fluid removed the propylene from the components so that the valve assembly operates correctly and does not require replacement.

To this end, the present invention generally comprises a valve assembly cleaning system. A conduit fluidly couples the liquid propane regulator and valve assembly to a propane tank. The cleaning system includes a first tube selectively coupled to the conduit such that the first tube is in fluid connection with the conduit and propane may flow from the propane tank to the assembly flows through the first tube. A container has a valve cleaning fluid therein. The container is in fluid communication with the first tube. Cleaning fluid may enter the conduit such that the valve assembly is cleaned by the cleaning fluid.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

The FIGURE is a block diagram view of a valve assembly cleaning device according to the present invention.

DESCRIPTION OF THE PREFERRED EMBODIMENT

With reference now to the FIGURE, a new engine cleaning systems embodying the principles and concepts of the present invention and generally designated by the reference numeral 10 will be described.

As best illustrated in the FIGURE, the valve assembly cleaning device 10 generally comprises a device for cleaning the liquid propane regulator and lock-off valve assembly 1 that is positioned between a propane burning engine 2 and a propane tank 4. A conduit 11 fluidly couples the liquid propane regulator and lock-off valve assembly 1 to a propane tank 4. The cleaning system includes a first tube 12 selectively coupled to the conduit 11 such that the first tube 12 is in fluid connection with the conduit 11 and propane flows from the propane tank 4 to the assembly flows through the first tube 12. The conduit 11 replaces a coupler, not shown, which conventionally couples sections of the conduit 11 together.

An inlet 13 is fluidly coupled to and extends away from the first tube 12. The inlet 13 extends away from the first tube 12. The inlet 13 and first tube 12 define a Y-fitting 14. The inlet 13 preferably has a one-way valve therein such that fluid can only enter the first tube 12 through the inlet 13. A second tube 15 has a first end 16 and a second end 17. The first end 16 is fluidly coupled to the inlet 13.

A container 18 has a valve cleaning fluid therein. The valve cleaning fluid may be any conventional carburetor cleaner. The container 18 has a valve member 19 fluidly coupled thereto for selectively opening and closing the container 18. The second end 17 of the second tube 15 is fluidly coupled to the valve member 19. Ideally, the valve cleaning fluid is pressurized.

In use, the valve member 19 is opened so that cleaning fluid may enter the conduit 11. Once the cleaning fluid is in the conduit 11, it flows through the valve assembly 1 with the propane. As it flows through the valve assembly 1, the components of the valve assembly 1 are cleaned. After flowing through the valve assembly 1, the cleaning fluid is brought into the engine 2 and combusted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A propane supply cleaning system for use with a propane burning internal combustion engine and a propane supply system for cleaning elements of the propane supply system, the propane supply system being of the type including a liquid propane tank for holding a quantity of propane, a first conduit fluidly connecting said propane tank and said propane burning internal combustion engine, and a liquid propane regulator and lock-off valve assembly in fluid communication with said first conduit such that propane flowing through said first conduit to said propane burning engine passes through said assembly, said propane supply cleaning system comprising:
   a connector for interposing in said first conduit between said propane regulator and lock-off valve assembly and said liquid propane tank so that said connector is in fluid communication with said first conduit and propane flowing from said propane tank to said assembly passes through said connector, said connector having a first tube and an inlet tube, said first tube being configured to fluidly communicate with said first conduit, said inlet tube being in fluid communication with said first tube;
   a container having a valve cleaning fluid therein, said cleaning fluid being pressurized in said container such that said cleaning fluid flows from said container into said second conduit and said connector for flowing into said first conduit and through said propane regulator and lock-off valve assembly when said valve member is opened;
   a second conduit fluidly connecting the container and the connector; and
   a valve member fluidly coupled to said container and configured to selectively permit and prevent flow from said container to said connector through said second conduit.

2. The system of claim 1 wherein said first tube of said connector has an axis, said inlet tube has an axis, and the axis of said inlet being skewed with respect to the axis of said first tube such that said axes converge in a direction of flow of propane through said supply system and diverge in a direction opposite of the flow of propane.

3. The system of claim 1 wherein the valve cleaning fluid comprises carburetor cleaner.

4. The system of claim 1 wherein said first tube of said connector has an axis, said inlet tube has an axis, and the axis of said inlet being skewed with respect to the axis of said first tube such that said axes converge in a direction of flow of propane through said supply system and diverge in a direction opposite of the flow of propane;
   wherein the valve cleaning fluid comprises carburetor cleaner.

5. In combination:
   a propane burning internal combustion engine;
   a propane supply system in fluid communication with said propane burning internal combustion engine configured to supply propane to said propane burning internal combustion engine for combustion by said engine; and
   a propane supply cleaning system in fluid communication with said propane supply system for passing cleaning fluid into said propane supply system and said propane burning engine.

6. The combination of claim 5 wherein said propane supply system comprises:
   a liquid propane tank for containing a quantity of propane;
   a first conduit fluidly connecting said propane tank and said propane burning internal combustion engine; and
   a liquid propane regulator and lock-off valve assembly in fluid communication with said first conduit such that propane flowing through said first conduit to said propane burning engine passes through said assembly.

7. The combination of claim 6 wherein said liquid propane regulator and lock-off valve assembly comprises:
   a propane pressure regulator configured to regulate pressure of the propane flowing through said first conduit; and
   a lock-off valve configured to selectively permit and prevent flow of propane therethrough and through said propane supply system.

8. The combination of claim 6 wherein said liquid propane tank contains a quantity of propane.

9. The combination of claim 6 wherein said propane supply cleaning system comprises:
   a connector interposed in said first conduit between said propane regulator and lock-off valve assembly and said liquid propane tank and being in fluid communication with said first conduit such that propane flowing from said propane tank to said assembly passes through said connector;
   a container for receiving a valve cleaning fluid therein;
   a second conduit fluidly connecting the container and the connector; and
   a valve member fluidly coupled to said container and configured to selectively permit and prevent flow from said container to said connector through said second conduit.

10. The combination of claim 9 wherein said connector has a first tube and an inlet tube, said first tube being in fluid communication with said first conduit, said inlet tube being in fluid communication with said first tube, said first tube having an axis, said inlet tube having an axis, the axis of said inlet being skewed with respect to the axis of said first tube such that said axes converge in a direction of flow of propane through said supply system and diverge in a direction opposite of the flow of propane.

11. The combination of claim 9 wherein the container contains a valve cleaning fluid.

12. The combination of claim 11 wherein the valve cleaning fluid comprises a carburetor cleaner.

13. The combination of claim 11 wherein said cleaning fluid is pressurized in said container such that said cleaning fluid flows from said container into said second conduit and said connector into said first conduit and through said propane regulator and lock-off valve assembly when said valve member is opened.

14. The combination of claim 5 wherein said propane supply system comprises:
   a liquid propane tank for containing a quantity of propane;
   a first conduit fluidly connecting said propane tank and said propane burning internal combustion engine; and
   a liquid propane regulator and lock-off valve assembly in fluid communication with said first conduit such that propane flowing through said first conduit to said propane burning engine passes through said assembly;
   wherein said liquid propane regulator and lock-off valve assembly comprises:
   a propane pressure regulator configured to regulate pressure of the propane flowing through said first conduit; and a lock-off valve configured to selectively permit and prevent flow of propane therethrough and through said propane supply system;
wherein said liquid propane tank contains a quantity of propane;
wherein said propane supply cleaning system comprises:
a connector interposed in said first conduit between said propane regulator and lock-off valve assembly and said liquid propane tank and being in fluid communication with said first conduit such that propane flowing from said propane tank to said assembly passes through said connector;
a container for receiving a valve cleaning fluid therein;
a second conduit fluidly connecting the container and the connector; and
a valve member fluidly coupled to said container and configured to selectively permit and prevent flow from said container to said connector through said second conduit;
wherein said connector has a first tube and an inlet tube, said first tube being in fluid communication with said first conduit, said inlet tube being in fluid communication with said first tube, said first tube having an axis, said inlet tube having an axis, the axis of said inlet being skewed with respect to the axis of said first tube such that said axes converge in a direction of flow of propane through said supply system and diverge in a direction opposite of the flow of propane;
wherein the container contains a valve cleaning fluid;
wherein the valve cleaning fluid comprises a carburetor cleaner; and
wherein said cleaning fluid is pressurized in said container such that said cleaning fluid flows from said container into said second conduit and said connector into said first conduit and through said propane regulator and lock-off valve assembly when said valve member is opened.

15. In combination:
a propane burning internal combustion engine;
a propane supply system in fluid communication with said propane burning internal combustion engine configured to supply propane to said propane burning internal combustion engine for combustion by said engine, said propane supply system comprising:
  a liquid propane tank containing a quantity of propane;
  a first conduit fluidly connecting said propane tank and said propane burning engine;
  a liquid propane regulator and lock-off valve assembly in fluid communication with said first conduit such that propane flowing through said first conduit to said propane burning engine passes through said assembly, said assembly comprising:
    a propane pressure regulator configured to regulate pressure of the propane flowing through said first conduit; and
    a lock-off valve configured to selectively permit and prevent flow of propane therethrough and through said propane supply system; and
  a propane supply cleaning system in fluid communication with said propane supply system for passing cleaning fluid into said propane supply system and said propane burning engine, said propane supply cleaning system comprising:
    a connector interposed in said first conduit between said propane regulator and lock-off valve assembly and said liquid propane tank and being in fluid communication with said first conduit such that propane flowing from said propane tank to said assembly passes through said connector, said connector having a first tube and an inlet tube, said first tube being in fluid communication with said first conduit, said inlet tube being in fluid communication with said first tube, said first tube having an axis, said inlet tube having an axis, the axis of said inlet being skewed with respect to the axis of said first tube such that said axes converge in a direction of flow of propane through said supply system and diverge in a direction opposite of the flow of propane;
    a container having a valve cleaning fluid therein, the valve cleaning fluid comprising carburetor cleaner;
    a second conduit fluidly connecting the container and the connector;
    a valve member fluidly coupled to said container and configured to selectively permit and prevent flow from said container to said connector through said second conduit;
    wherein said cleaning fluid is pressurized in said container such that said cleaning fluid flows from said container into said second conduit and said connector into said first conduit and through said propane regulator and lock-off valve assembly when said valve member is opened.

* * * * *